United States Patent Office 3,175,284
Patented Mar. 30, 1965

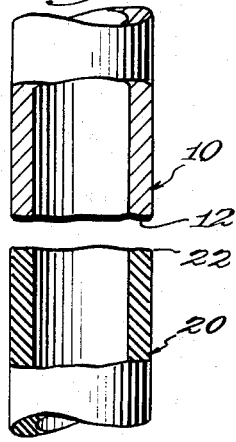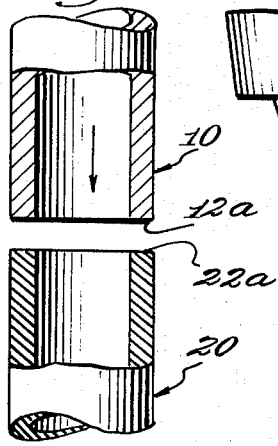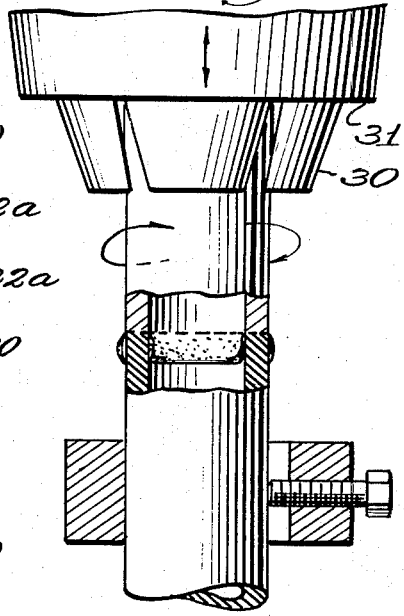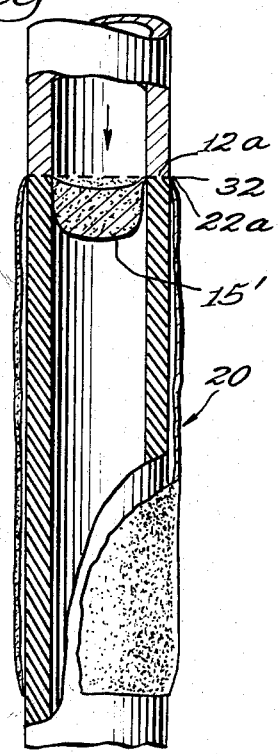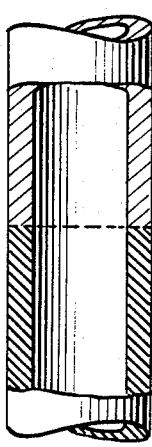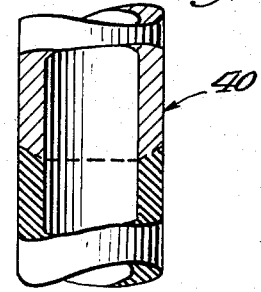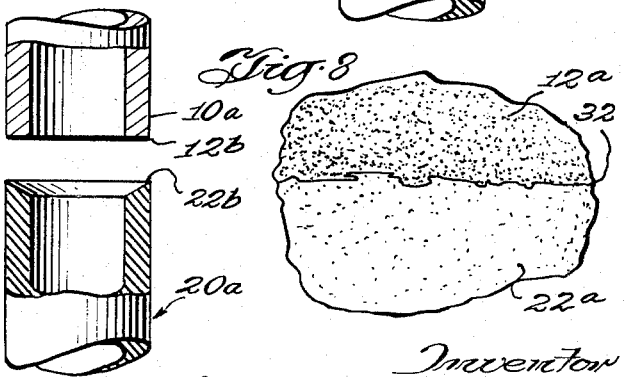

3,175,284
METHOD OF FRICTION WELDING
DISSIMILAR METALS
Sherwyn Cotovsky, Chicago, Ill., assignor to Chicago
Bridge & Iron Company, a corporation of Illinois
Filed Oct. 15, 1962, Ser. No. 230,374
8 Claims. (Cl. 29—470.3)

This invention relates to the joining of two dissimilar metals and more particularly to the friction bonding of a getter metal such as aluminum, magnesium or titanium or their alloys and a metal surface having a higher melting point than the getter metal.

The prior art had known of friction bonding but had been unable to obtain joints with metals and getter metals of sufficient strength and/or ductility for commercial purposes. Because of this inadequacy it had been necessary to join such materials by conventional welding methods which required the use of special atmospheres and fluxes or to circumvent the problem by introducing a third metal. The weld produced was therefore either an alloy of the two joined materials, which is always hopelessly brittle, or a completely foreign substance such as silver. This defeated the purpose of the joint where the materials had been joined to utilize their dissimilar qualities, such as in the conduction of heat or electricity.

The present invention provides a method of joining metals and getter metals which will produce a bond of high strength and quality without the use of special atmospheres or fluxes and without adding a new material to form the bond. In the present method, the bond is essentially a getter metal surface fused directly to a metal surface.

The invention will be illustrated and described in connection with the accompanying drawings in which:

FIGURE 1 is a fragmentary sectional view of two tubular members, to be joined by the present method;

FIGURE 2 is another fragmentary sectional view of the tubular members after their surfaces have been prepared for the joining operation;

FIGURE 3 is a sectional view of the tubular members being rotated against each other and the apparatus used;

FIGURE 4 is a fragmentary sectional view of the joined tubular members;

FIGURE 5 is a sectional view of the joined tubular members with runout material removed;

FIGURE 6 is a sectional view of the tubular members after their abutting surfaces have been prepared in a modified form of the present invention;

FIGURE 7 is a sectional view of the joined tubular members with runout material removed in a modified form of the present invention; and FIGURE 8 is a greatly enlarged sectional view of an interface of the joined surfaces.

Referring initially to FIGURE 1, there are shown two tubular members including a getter metal 10 such as aluminum, magnesium, titanium, or their alloys and a ferrous or non-ferrous metal 20 to be joined at their surfaces 12 and 22. For the purpose of facilitating an understanding of this invention aluminum is employed as the getter material and stainless steel is used in the following description of an illustrative specific embodiment of this invention, it being understood however, that no limitation is inferred.

Shown in FIGURE 2 are the end surfaces 12a and 22a of the tubular members 10 and 20 from which gross oxides and other foreign materials such as oil and grease have been removed such as by machining in a lathe. End surface 22a of the stainless steel tubular member 20 may also be polished and preheated to further prepare it for the bonding operation.

In FIGURE 3 the aluminum tubular member 10 is secured in a power driven, reciprocatively mounted, rotatable chuck or other suitable rotatable holding device 30. The stainless steel member 20 is held stationary by a holding device 34 or may be rotated in the opposite direction. The surface ends 12a and 22a are brought into abutment and coaxial alignment and the aluminum tubular member 10 rotated in frictional contact with the stainless steel tubular member 20. By a continual application of pressure of the aluminum member 10 against the stainless steel member 20 while they are in rotational contact the frictional heat generated raises the temperature of the aluminum member 10 to its melting point. Runout material 15 is a molten admixture of the aluminum member 12a and impurities on the stainless steel member end surface 22a.

In order to obtain a suitable bond at the interface 22 between end surfaces 12a and 22a, it is necessary to continue the generation of frictional heat until the stainless steel surface has been sufficiently outgassed of hydrogen and other occluded gases and any residual surface oxides present on the end surface 12a of the stainless steel tubular member 20 have been carried away in the runout. The extent of runout 15 is indicative of the degree of the removal of such contaminants.

If a smooth walled tubular member 40, as illustrated in FIGURE 5, is desired, the outer sleeve of runout material 15 can be machined off and the inner plug 15' can be drilled or punched out after the joined member 40 has cooled, because the runout material does not bond at all with the surface of the stainless steel.

Shown in FIGURE 6 is a modified form of the present invention in which the surface 12b of the aluminum member 10a has been machined to remove surface impurities. The surface 22b of the stainless steel member 20 has been tapered to an incline of approximately 15°.

Shown in FIGURE 7 is the straight tubular member 40a created by the frictional heat generated by the rotational contact of the aluminum member 10a with the tapered stainless steel surface 22b after the runout has been machined away from stainless steel member 20a.

The greatly enlarged view of FIGURE 8 represents the interface 32 of the joined aluminum 12 and stainless steel surfaces 22a. No new composition is created at the interface 32 and the interface is substantially free from any residual third composition with the transition going from the one metal directly to the getter metal.

In a specific illustrative embodiment of the present invention a 3003 aluminum nominal ¾ inch pipe was joined to a nominal ¾ inch 303 stainless steel pipe. The stainless steel pipe end surface was machined on a lathe to remove a thin facing of metal. The machined surface was then polished with a fine abrasive. The aluminum pipe end surface was similarly machined to a flat surface, merely to expose fresh material.

The aluminum pipe was then rotated at 1000 r.p.m. in a lathe and brought into coaxial alignment and frictional contact with the stainless steel pipe that had been rigidly fixed. A pressure of 200 p.s.i. continuously urged the aluminum pipe against the stainless steel pipe. The aluminum liquefied at the interface and flowed inside and outside the stainless steel pipe thus carrying away outgassed hydrogen and oxide contaminants. The most desirable bond using this size pipe was formed when the runout extended from 4 to 6 inches along the outside surface of the stainless steel pipe.

The machine was stopped and a slight extra pressure was exerted and maintained until the joined members had cooled. A ductile bond, dependably leak-tight even under stringent tests including thermal cycling, was produced. Approximate time for the bonding operation: 30 seconds.

In modified form of the present invention a getter metal member was joined to a much larger metal member by welding a metal plate across the open end of the metal member. The getter metal member was rotated against the stainless steel plate in accordance with the present method until a joint formed.

The foregoing detailed description has been given for clearness of understanding only, and no unnecessary limitations should be understood therefrom, as modifications will be obvious to those skilled in the art.

The amount of runout to form a suitable bond will necessarily vary with the size and type of material to be joined. Whereas a runout of 4–6 inches was proper for aluminum and stainless steel other lengths are required where the getter material is titanium, magnesium or their alloys and the metal is copper, brass, bronze, steel, nickel or ferrous metals such as iron.

The pressure required will have to be determined by the size of the members and can be increased to shorten the time for the operation.

What is claimed is:

1. A method for joining a metal surface selected from the group consisting of copper, brass, bronze, steel, nickel and ferrous metals, directly to a getter metal surface of a lower melting point, said getter metal selected from the group consisting of aluminum, titanium and their alloys, said method comprising:
    cleaning said surfaces to remove surface oxides and foreign materials;
    rotating one of said surfaces relative to and in direct contact with the other surface to generate a sufficient amount of frictional heat to melt the getter metal surface;
    continuing to generate frictional heat by rotational contact to allow a sufficient amount of liquefied getter metal to run out so as to carry away impurities and to raise the temperature of a sufficient mass of metal to the melting point of the getter metal so that the interface will remain at that temperature during the discontinuance of the rotational contact thereby creating joined surfaces;
    discontinuing said rotation;
    and allowing the joined surfaces to cool.

2. A method as recited in claim 1 wherein one of said surfaces is maintained in a stationary position while the other is rotated against it.

3. A method as recited in claim 1 and comprising removing said runout material from around the joined surfaces so that said metal and said getter metal are joined only at their surfaces.

4. A method for joining a metal surface selected from the group consisting of copper, brass, bronze, steel, nickel and ferrous metals, directly to a getter metal surface of lower melting point, said getter metal selected from the group consisting of aluminum, titanium and their alloys, said method comprising:
    heating said metal to outgas said surface;
    maintaining the temperature of said metal surface until rotational contact is begun;
    cleaning said surfaces to remove surface oxides and foreign materials;
    rotating one of said surfaces relative to and in direct contact with the other surface to generate a sufficient amount of frictional heat to melt the getter metal surface;
    continuing to generate frictional heat by rotational contact to allow a sufficient amount of liquefied getter metal to run out so as to carry away impurities and to raise the temperature of a sufficient mass of metal to the melting point of the getter metal so that the interface will remain at that temperature during the discontinuance of the rotational contact thereby creating joined surfaces;
    discontinuing said rotation;
    and allowing the joined surfaces to cool.

5. A method for joining a metal surface selected from the group consisting of copper, brass, bronze, steel, nickel and ferrous metals, directly to a getter metal surface of a lower melting point, said getter metal selected from the group consisting of aluminum, titanium and their alloys, wherein both are the surfaces of tubular members, said method comprising:
    machining the surface of the metal tubular member to the taper of the joint desired;
    cleaning said surfaces to remove surface oxides and foreign materials;
    rotating one of said surfaces relative to and in direct contact with the other surface to generate a sufficient amount of frictional heat to melt the getter metal surface;
    continuing to generate frictional heat by rotational contact to allow a sufficient amount of liquefied getter metal to run out so as to carry away impurities and to raise the temperature of a sufficient mass of metal to the melting point of the getter metal so so that the interface will remain at that temperature during the discontinuance of the rotational contact thereby creating joined surfaces, said runout extending four to six inches along the outside of the metal tubular member;
    discontinuing said rotation;
    allowing the joined surfaces to cool;
    and removing the outside and inside casing of runout from the metal tubular member.

6. A method for joining a stainless steel surface to an aluminum surface, said method comprising:
    cleaning said surfaces to remove surface oxides and foreign materials;
    rotating one of said surfaces relative to and in direct contact with the other surface to generate a sufficient amount of frictional heat to melt the aluminum metal surface;
    continuing to generate frictional heat by rotational contact to allow a sufficient amount of liquefied aluminum to run out so as to carry away impurities and to raise the temperature of a sufficient mass of stainless steel to the melting point of the aluminum during the discontinuance of the rotational contact thereby creating joined surfaces;
    discontinuing said rotation; and,
    allowing the joined surfaces to cool.

7. A method for joining in coaxial alignment a stainless steel tubular member and an aluminum tubular member, said members having end surfaces, said method comprising:
    cleaning said surfaces to remove surface oxides and foreign materials;
    rotating one of said surfaces relative to and in direct contact with the other surface to generate a sufficient amount of frictional heat to melt the end surface of the aluminum member;
    continuing to generate frictional heat by rotational contact to allow four to six inches of liquefied aluminum to run out so as to carry away impurities and to raise the temperature of a sufficient mass of said stainless steel member to the melting point of the aluminum during the discontinuance of the rotational contact thereby creating joined surfaces;
    discontinuing said rotation; and,
    allowing the joined surfaces to cool.

8. A method of joining a stainless steel surface to a titanium surface said method comprising:
    cleaning said surfaces to remove surface oxides and foreign materials;
    rotating one of said surfaces relative to and in direct contact with the other surface to generate a sufficient amount of frictional heat to melt the titanium metal surface;

continuing to generate frictional heat by rotational contact to allow a sufficient amount of liquefied titanium to run out so as to carry away impurities and to raise the temperature of a sufficient mass of stainless steel to the melting point of the titanium so that the interface will remain at that temperature during the discontinuance of the rotational contact thereby creating joined surfaces;

discontinuing said rotation; and, allowing the joined surfaces to cool.

References Cited by the Examiner

UNITED STATES PATENTS

| | | | |
|---|---|---|---|
| 2,698,548 | 1/55 | Sowter | 29—497.5 X |
| 2,835,965 | 5/58 | Armacost | 29—470.5 |
| 3,055,096 | 9/62 | Bertossa | 29—494 X |
| 3,083,452 | 4/63 | Terrill et al. | 29—487 |

FOREIGN PATENTS 1,265,578   5/61   France.

JOHN F. CAMPBELL, *Primary Examiner.*